Figure 1:
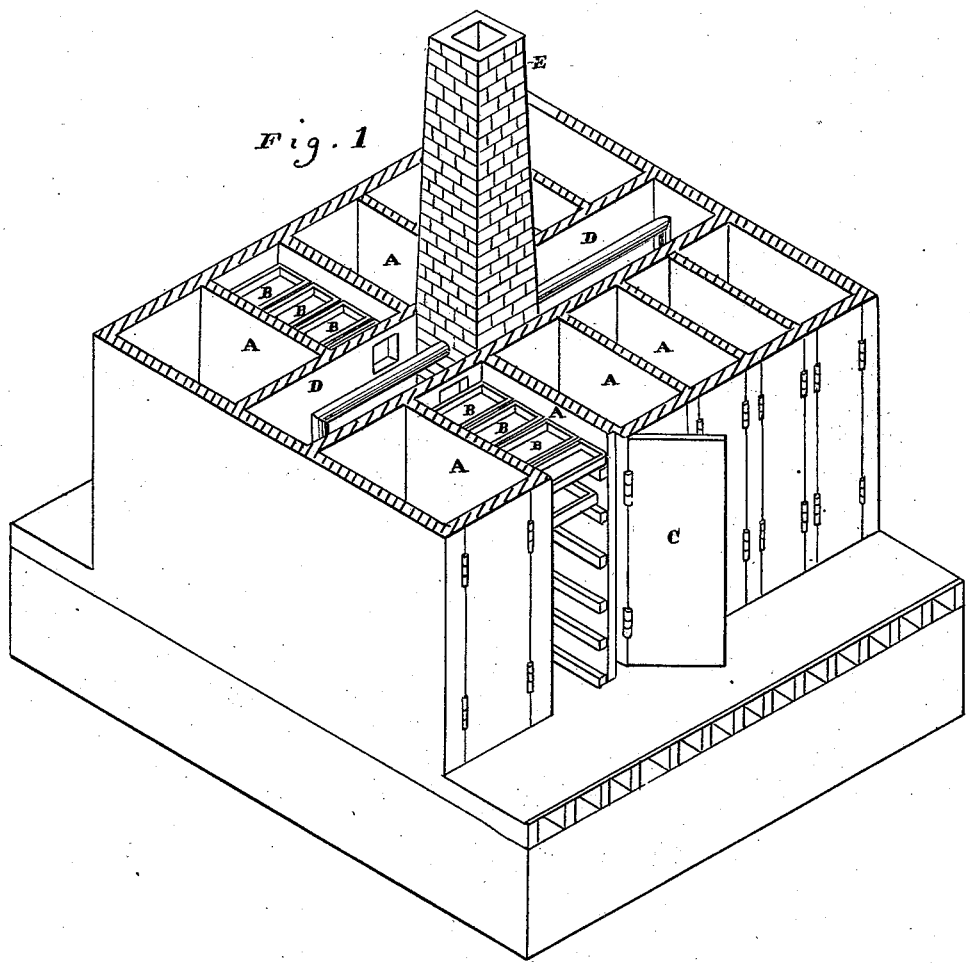
Figure 2:
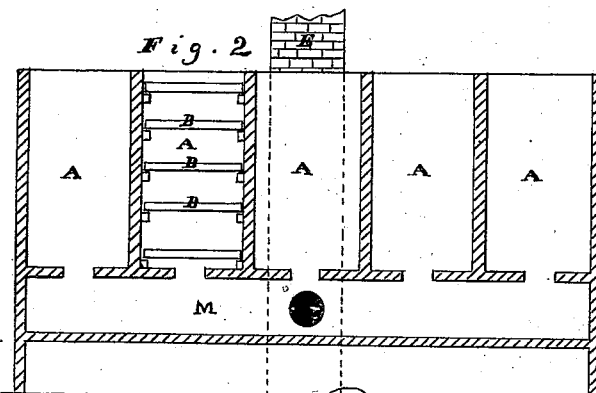
Figure 3:
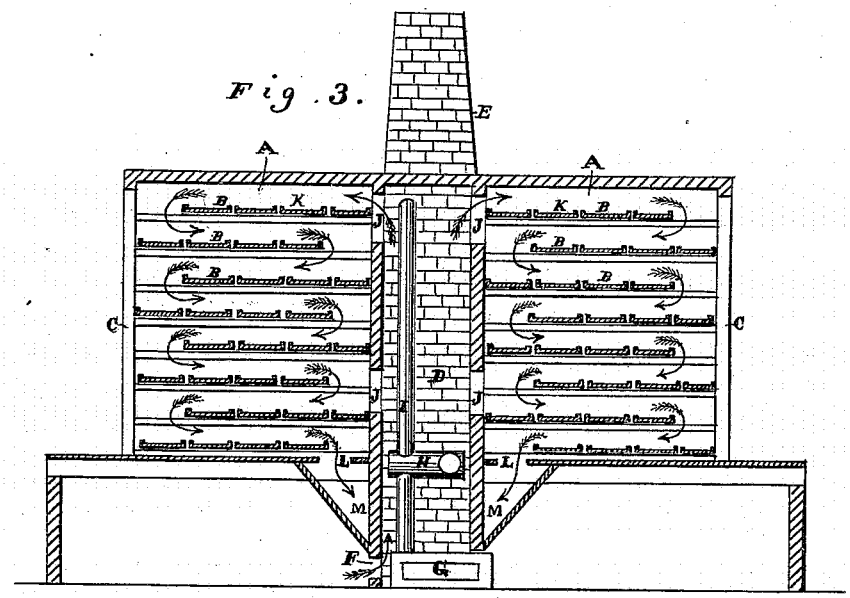
Figure 4:
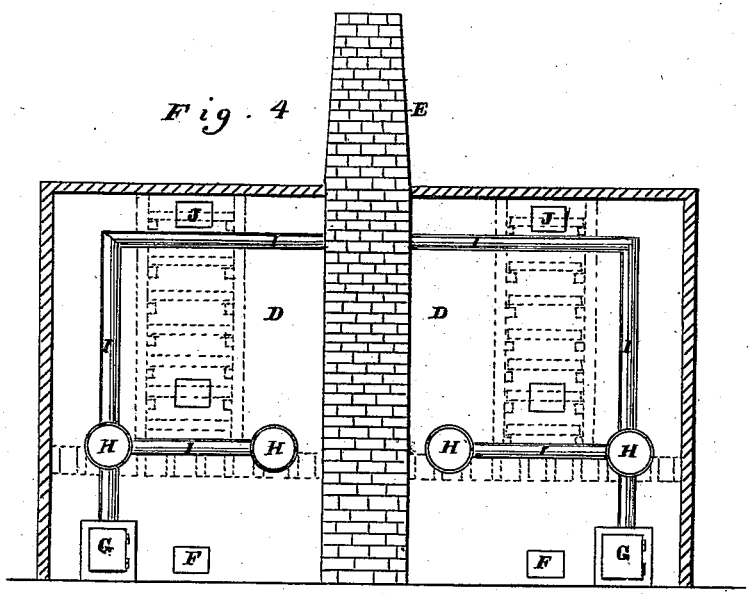

R. B. BLOWERS.
FRUIT-DRIER.

No. 187,349.

2 Sheets—Sheet 1.

Patented Feb. 13, 1877.

Witnesses
Geo. H. Strong
Jno. L. Boone

Inventor
Russell B. Blowers
by Dewey & Co.
Attys.

2 Sheets—Sheet 2.

R. B. BLOWERS.
FRUIT-DRIER.

No. 187,349. Patented Feb. 13, 1877.

Witnesses
Geo. H. Strong
Jns. L. Boone

Inventor
Russell B. Blowers
by Dewey & Co
Attys.

N. PETERS, PHOTO-LITHOGRAPHER, WASHINGTON, D. C.

UNITED STATES PATENT OFFICE.

RUSSEL B. BLOWERS, OF WOODLAND, CALIFORNIA.

IMPROVEMENT IN FRUIT-DRIERS.

Specification forming part of Letters Patent No. 187,349, dated February 13, 1877; application filed January 2, 1877.

*To all whom it may concern:*

Be it known that I, RUSSEL B. BLOWERS, of Woodland, county of Yolo, and State of California, have invented an Improved Fruit-Drier; and I do hereby declare the following to be a full, clear, and exact description thereof, reference being had to the accompanying drawings.

The object of my invention is to provide a novel, cheap, and effective apparatus for drying fruit of all kinds, but it is more especially valuable as an assistant in curing raisins which have been partially dried in the open air, but have not been completed because of bad weather.

My invention consists in the construction and combination of certain furnaces, heating-chambers, drying-rooms, and other devices, as hereinafter more specifically described and claimed.

In curing grapes for raisins, it is well known that the best product is obtained by open-air or sun drying, and this can only be accomplished in climates which are rendered very dry by reason of long rainless seasons, such as occur in California, and in some other parts of the United States.

A great difficulty is, however, encountered from the fact that the season when the grapes are in proper condition to be cured is so near the border of the rainy season that the half-cured fruit is often caught by the early rains, and although it may be covered and protected from the direct injury of wet, yet the atmosphere never becomes dry enough again after these rains to properly complete the curing of the raisins.

I therefore supplement this sun-drying by the addition of artificial heat, and it is necessary at the same time that the fruit should be handled as little as possible from the time it is picked until it is packed in the boxes.

To effect this I construct any number of rooms or chambers, A, of considerable length, and of a width sufficient to receive the trays B, upon which the fruit is picked and arranged in layers. These trays slide upon cleats nailed to the sides of the chambers to receive them, and access may be had to any chamber to fill or empty it by simply opening the outer door C. The chambers A are placed preferably in parallel lines, with their inner ends abutting upon a central longitudinal heating chamber or chambers, D. In the present case I have shown two of these chambers, situated one upon each side of an uptake or chimney, E, the object of which is to create the necessary draft or current, as will be more fully described hereafter. The drying-chambers A are shown as being built upon a floor, while the walls of the heating-chamber D extend down to the floor or basement beneath, so that the chamber is perfectly tight. Doors, valves, or traps F open into this chamber, and admit as much air as may be needed, being properly regulated.

The device for heating the air consists of box stoves or furnaces G, of any suitable pattern, and these have large drums H, through which their pipes or flues I lead, so that the air which is admitted through the valves F will be sufficiently heated.

Suitable doors or gates J are made in the walls of this heating-chamber, opening into each of the drying-rooms A at any points, but principally at the top, so that a current of hot air will flow over the upper surface of the fruit contained in the upper tier K of trays.

This upper tier does not extend to the extreme front of the room, but leaves a space sufficient for the current of hot air to descend at the outer end, and thence pass backward over the next tier. This second tier is arranged so as to allow the heated air to descend behind its inner end, and all the alternate tiers are placed so that the hot air flows back and forward, descending alternately at the inner and outer ends of the tiers until it reaches the bottom. At the bottom of each chamber is a door or opening, L, properly regulated, to allow the current of air to escape into the longitudinal flues or passages M, of which there is one upon each side of the heating-chamber, to receive the air from all the rooms upon that side, and conduct it to the flue or chimney E, which rises to such a height that a strong draft is created, which is assisted by the escape of the products of combustion from the furnaces, these being also carried into this chimney.

It will now be seen that the number of rooms for drying purposes can be almost indefinitely increased by simply lengthening the heating-chamber D, and providing a sufficient number of furnaces, and when the rooms are closed with their tiers of close-bottomed trays, the air can only enter the chamber D through the proper doors F, and must pass over the whole of the tiers of fruit from the top of the chamber to the bottom, escaping through the flues M and chimney E, which provides so strong a draft that no artificial draft will be necessary.

The trays of fruit may be removed from the field to the drying-house without handling the fruit itself, and the product turned out in the best possible condition.

I am aware that cylindrical heating-chambers have been surrounded by a number of distinct drying-chambers, and that a series of drying-chambers have been heated from a common furnace. I am also aware that shelves have been so placed that alternate openings were left at the ends for upwardly-moving heat, and I do not therefore claim, broadly, these devices; but What I do claim as new, and desire to secure by Letters Patent, is—

1. The elongated heating-chamber D, with its furnaces and ingress-doors F, as shown, in combination with the double series of drying-rooms A, situated upon opposite sides of the chamber D, said rooms being fitted to receive the tiers of trays K, so as to leave spaces alternately at either end, and provided with doors J at the top, opening into the heating-chamber and doors L at the bottom, connecting with the uptake or chimney E, so that the heat will pass transversely above each tier of trays, substantially as and for the purpose herein described.

2. The elongated heating-chamber D, and the double row of drying-chambers A, arranged to receive the tiers of trays K, and having the doors or gates F, J, and L, in combination with the receiving-flues M, extending upon each side, and opening into the chimney E, substantially as herein described.

In witness whereof I have hereunto set my hand and seal.

RUSSEL B. BLOWERS. [L. S.]

Witnesses:
 PARDON H. SIBLEY,
 GEO. H. STRONG.